Figure 1:
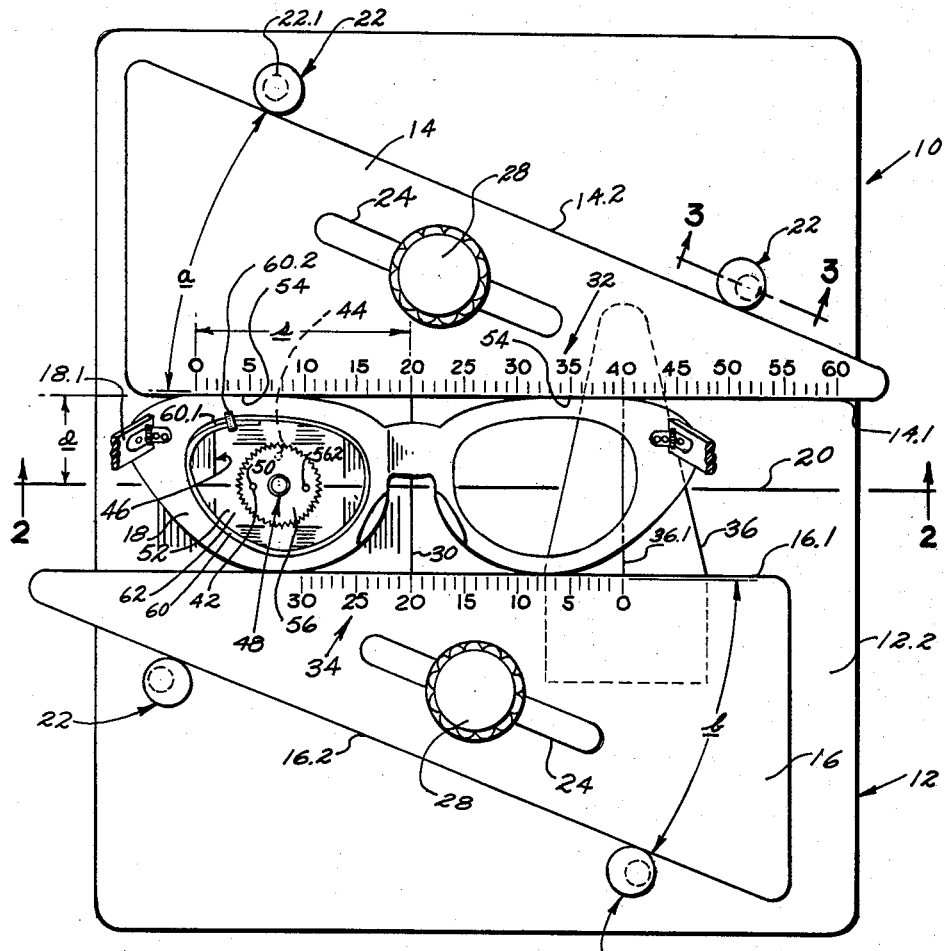

Aug. 25, 1964   N. W. SHATZEL   3,145,417
APPARATUS FOR MAKING AND BOXING A LENS PATTERN
Filed Oct. 28, 1963   2 Sheets-Sheet 1

INVENTOR.
NORMAN W. SHATZEL
BY James B McAndrews
ATTORNEY

Aug. 25, 1964   N. W. SHATZEL   3,145,417
APPARATUS FOR MAKING AND BOXING A LENS PATTERN
Filed Oct. 28, 1963   2 Sheets-Sheet 2
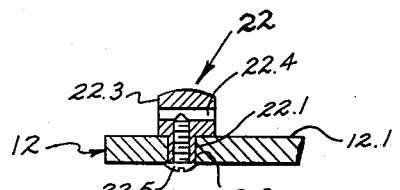
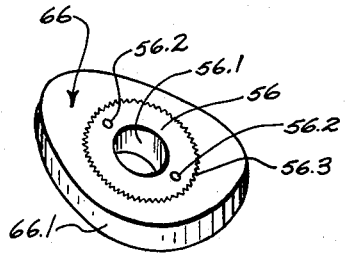
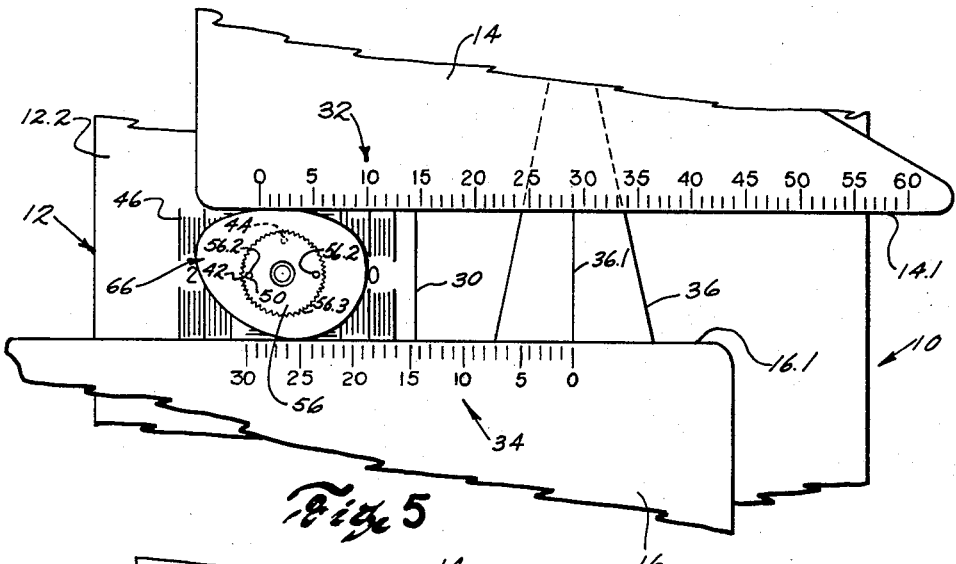
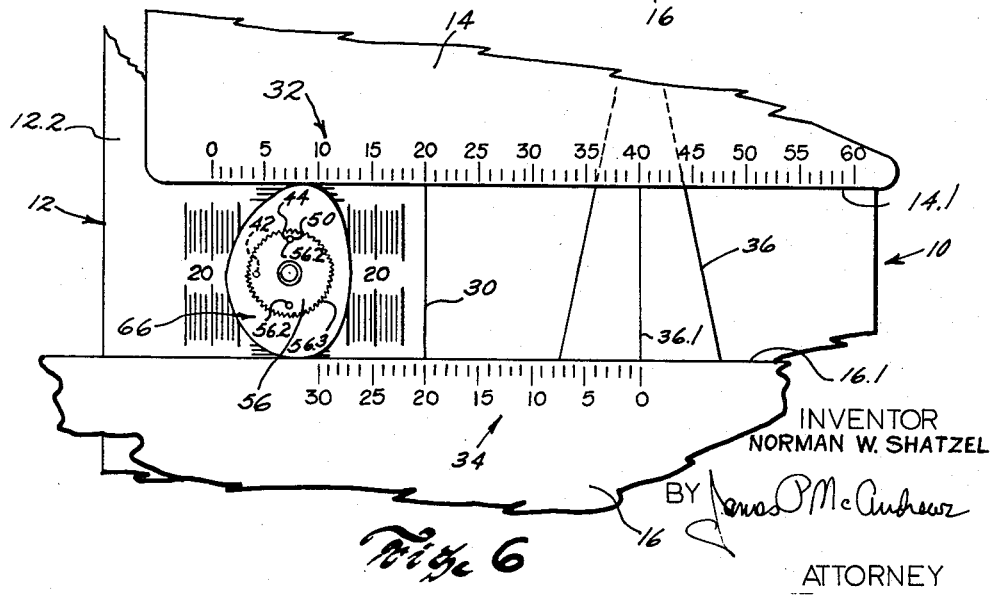
INVENTOR
NORMAN W. SHATZEL
BY
ATTORNEY 3,145,417
APPARATUS FOR MAKING AND BOXING
A LENS PATTERN
Norman W. Shatzel, Williamsville, N.Y., assignor to American Optical Company, Southbridge, Mass., a voluntary association of Massachusetts
Filed Oct. 28, 1963, Ser. No. 319,229
8 Claims. (Cl. 18—5)

The field of this invention is that of ophthalmic lenses and the invention relates more particularly to novel and improved apparatus for making and boxing lenses patterns to be used in the prepaartion of ophthalmic lenses.

In conventional practice, the manufacturers of ophthalmic frames provide lens patterns having outer configurations corresponding to the configurations of lenses to be mounted in their frames. Opticians can employ these lens patterns in the manner of cams to guide lens cutting and edging machines for forming finished lenses to fit the frames. For example, the lens patterns can be employed in an edging machine as shown in U.S. Pat. No. 3,063,340. The manufacturers of opthalmic frames also provide specification sheets and the like indicating the box dimensions of lenses to be mounted in the frames, the box dimensions comprising the horizontal and vertical dimensions of said lenses as mounted in said frames. The box dimensions of the lenses can be employed by opticians in selecting appropriate lens blanks to be used in preparing the lenses. With the great number of ophthalmic frame designs which are presently being sold, however, opticians are frequently faced with the problem of providing replacement lenses to fit frames which were not originally supplied by the opticians and for which the opticians have no lens patterns or lens specifications immediately available. In such situations, the box dimensions of lenses to fit the frames can be determined only with considerable inconvenience by measuring what are estimated to be the horizontal and vertical dimensions of the lens opening of the frames, and the lense themselves must usually be cut and edged by hand in a time-consuming and expensive manner.

It is an object of this invention to provide novel and improved apparatus for making lens patterns to be used in preparing lenses to fit ophthalmic frames. It is also an object of this invention to provide such apparatus for making lens patterns which can also be used for conveniently and accurately determining the box dimensions of lenses necessary to fit said frames. It is an additional object of this invention to provide such apparatus for making and boxing lens patterns which is of simple, rugged and inexpensive construction and which can be conveniently, accurately and economically employed.

Briefly described, the apparatus provided by this invention for making and boxing a lens pattern includes a base and a pair of adjustable clamps which are mounted in spaced relation to each other, the clamps being adapted to be moved toward each other to grip and hold an ophthalmic frame between the clamps in such a disposition that a lens opening of the frame extends horizontally over the base. The apparatus also includes a lining to be arranged around the periphery of the lens opening of the frame in abutting relation to the plate beneath the frame, thereby to form an open-ended mold cavity having a configuration corresponding to the configuration of the lens opening. The apparatus also includes means for introducing moldable material into the mold cavity for forming a lens pattern therein. The apparatus further includes means for indicating the spacing between the clamps. In this construction, a lens pattern can be molded in a mold cavity formed directly inside a lens opening of the frame while the frame is held between clamps. Thereafter, the lens pattern itself can be held between the clamps and the box dimensions of the lens pattern can be determined by reference to the spacing between the clamps as the pattern is held by the clamps.

Figure 2:
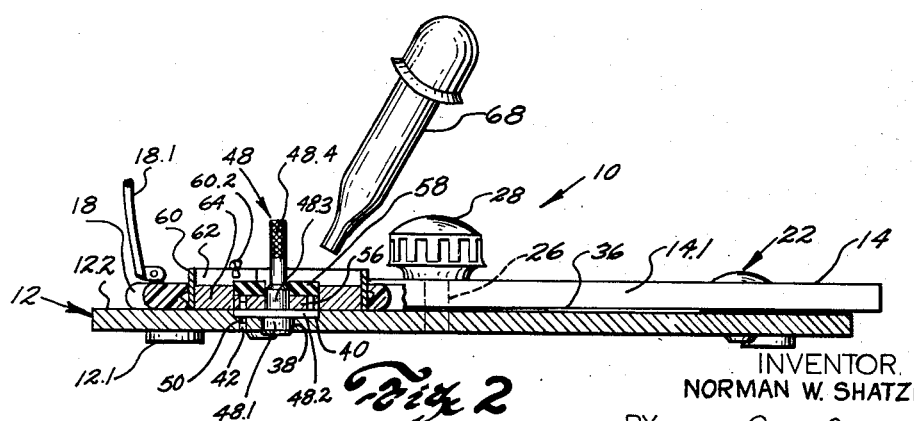

Other objects, features, advantages and details of the apparatus of this invention appear in the following detailed description of preferred embodiments of the apparatus, the detailed description referring to the drawings in which:

FIG. 1 is a plan view of the apparatus of this invention;
FIG. 2 is a section view along line 2—2 of FIG. 1;
FIG. 3 is a section view along line 3—3 of FIG. 1;
FIG. 4 is a perspective view of a lens pattern made according to this invention; and
FIGS. 5 and 6 are partial plan views similar to FIG. 1 showing use of the apparatus of this invention for boxing a lens pattern.

Referring to the drawings, 10 indicates the novel and improved apparatus provided by this invention for making and boxing a lens pattern for an ophthalmic frame. As shown, the apparatus can include a base plate 12 and can have feet 12.1 or the like of rubber or similar material cemented or otherwise attached to the underside of the plate. The plate should have a flat upper surface 12.2 of substantial size sufficient to accommodate any ophthalmic frame likely to be encountered. The plate can be formed of wood or plastic or the like but is preferably formed of metal or other material of relatively high dimensional stability and heat conductivity.

In accordance with this invention, two slides or clamps 14 and 16 are adjustably mounted upon the base plate 12 so that the slides can be moved toward each other for gripping an ophthalmic frame 18 therebetween. As shown particularly in FIGS. 1 and 2, the slides 14 and 16 can have first edges, 14.1 and 16.1 respectively, which can be arranged parallel to each other and to a center or reference line 20 extending across the base plate. The reference line 20 is shown in FIG. 1 for clarity of illustration, but as will be understood, need not actually be marked on the base plate 12. Each slide can also have another edge, 14.2 and 16.2 respectively, extending obliquely away from the reference line 20, this other slide edge slidably engaged with a pair of bumper pins 22 secured to the base plate. In this construction, each pair of bumper pins 22 engaging a slide edge can be said to form a stop or shoulder which extends obliquely away from the reference line 20 and the slides can be moved in sliding engagement along respective shoulders for moving the slide edges 14.1 or 16.1 toward or away from the reference line 20 while maintaining said slide edges in parallel relation to the reference line and to each other. Of course, any other suitable means for moving the clamps 14 and 16 relative to each other would be within the scope of this invention. Each slide can have a slot 24 preferably extending parallel to the slide edge engaged by the bumper pins 22, and a stud 26 having a knob 28 fixed thereon can extend through each slot to be threadedly engaged in the base plate 12. As will be understood, the knob 28 can be rotated to be drawn down onto its respective slide by action of the stud 26 in threadedly engaging the base plate, thereby to releasably secure the slide in a selected position of adjustment.

As the slide 14 is moved slidingly along a pair of bumper pins 22 for moving the slide edge 14.1 toward or away from the reference line 20, the slide will also move to the left or right to an extent which is proportional to movement of the slide relative to the reference line. Accordingly, a reference mark 30 can be inscribed or otherwise formed upon the base plate 12 and a line of corresponding indicia 32 can be formed along the slide edge 14.1, the zero point or left hand end of the line of indicia 32 being arranged to be aligned with the plate mark 30 when the slide edge 14.1 is disposed against the reference line 20. Movement of the slide 14 for a distance $d$ away from the reference line will result in movement of the slide for a distance $s$ to the left of the mark 30, the distance $s$ being equal to the distance $d$ divided by the tangent of the angle $a$ between the slide edges 14.1 and 14.2 as will be understood. Accordingly the other indicia 32 can be proportioned to become aligned with the mark 30 in sequence as the slide is moved to the left and away from the line 20, thereby to indicate the spacing of the slide edge 14.1 from the line 20. Preferably the indicia 32 can be proportioned and numbered to indicate the spacing of the slide edge from the reference line in millimeters. The slide 16 can be marked with a corresponding line of indicia 34 which can be adapted to be aligned with the reference mark 30 for indicating spacing of the slide edge 16.1 from the line 20. In this regard it will be noted that the slide 16 can be adapted to move to the right at it is moved away from the reference line 20 and accordingly, the zero point of the line of indicia 34 should be located at the right hand end of said line of indicia. Where the slides 14 and 16 are substantially identical so that the angle $b$ between the slide edges 16.1 and 16.2 equals the angle $a$ between corresponding edges of the slide 14, a pointer 36 attached to the slide 16 for movement therewith. The pointer can be arranged to be aligned with the zero point of line of indicia 32 on the slide 14 when the slide edges 14.1 and 16.1 are each disposed against the reference line 20. In this arrangement, when either one or both of the slides is moved away from the reference line, the pointer 36 can become aligned with appropriate indicia 32 to indicate the total spacing between the slide edges 14.1 and 16.1 as will be understood. Preferably the pointer 36 can comprise a thin flat member which is cemented or otherwise attached to the underside of the slide 16 and which is adapted to extend in sliding relation beneath the slide 14, the center of the pointer being inscribed or otherwise marked as at 36.1.

In a preferred construction of the apparatus 10, each bumper pin 22 can have a portion 22.1 of reduced diameter rotatably fitted within a matching hole 22.2 in the base plate 12 as shown in FIG. 3. Each pin can also have an eccentric portion 22.3 of relatively larger diameter extending above the base plate surface 12.2, this eccentric portion having a wrench hole 22.4 or other comparable means by which the bumper pin can be rotated in its matching hole in the base plate. A screw 22.5 can be threadedly engaged with the bumper pin and can engage the underside of the base plate 12 as shown in FIG. 3 so that the screw can be tightened for locking the bumper pin in a selected position of rotation in the base plate. In this construction, the slides 14 and 16 can be arranged with their edges 14.1 and 16.1 aligned with the reference or center line 20 and the bumper pins 22 can be fitted within their matching holes in the base plate. The bumper pins can then be rotated, by means of a dowel (not shown) inserted in the wrench holes 22.4 for example, until the eccentric portions 22.3 of the bumper pins engage the slide edges 14.2 and 16.2. The screws 22.5 can then be tightened for locking the bumper pins in said positions. In this way, the pins can be very accurately and conveniently located to define stops or shoulders upon which the slides or clamps 14 and 16 can be slidably adjusted with their edges 14.1 and 16.1 parallel to the reference line 20 in the manner above described.

In a preferred embodiment of the apparatus of this invention, the base plate 12 can have an aperture 38 therein at a point on the center or reference line 20. The aperture 38 can also be counterbored as at 40 at the upper surface 12.2 of the base plate. In addition, two smaller locating holes 42 and 44 can be formed in the bottom of the counterbore 40, these locating holes being disposed at an angle of 90° relative to each other around the central aperture 38. See FIGS. 1 and 2. Preferably one of these locating holes can be formed on the reference line 20 of the base plate as shown in FIG. 1. The upper surface 12.2 of the base plate is preferably inscribed or otherwise marked as at 46 to indicate distances radially outward along the plate surface from the center of the aperture 38. The indicia 46 preferably indicates said distances in millimeters.

A centering post 48 can have a portion 48.1 of suitable diameter to be rotatably fitted within the base plate aperture 38 and can have a flange portion 48.2 to be accommodated within and to substantially fill the counterbore 40, this flange portion preferably being adapted to fit flush with the plate surface 12.2. The post 48 can also have a portion 48.3 of selected diameter extending above the base plate surface 12.2 and can have an upwardly extending handle portion 48.4 which is preferably knurled or otherwise adapted to be conveniently gripped for lifting the post 48 from the aperture 38. A locating pin 50 can be fixed within the post flange portion 48.2 in any conventional manner and can be adapted to extend downwardly into either one of the locating holes 42 or 44. The locating pin 50 can also extend upwardly from the post flange portion 48.2 as shown in FIG. 2.

In accordance with this invention, the ophthalmic frame 18 can be arranged so that a lens opening 52 of the frame fits around the post 48 and extends in a substantially horizontal plane over the base plate surface 12.2. That is, the frame can be placed with its front resting against the plate surface so that the temple pieces 18.1 of the frame extend upwardly from the plate. The location of the frame can then be adjusted by reference to the indicia 46 so that the centering post 48 extends through the geometrical center of the lens opening 52.

When the frame has been positioned in this manner, the slides or clamps 14 and 16 can be moved together for gripping and holding the frame 18 therebetween the slides then being locked in this position of adjustment in clamping or gripping relation to the frame by means of the knobs 28. As the slide jaws or edges 14.1 and 16.1 are of considerable length and are maintained parallel to the reference line 20, they can each engage two corresponding portions of the symmetrical frame 18 as indicated at 54 in FIG. 1, whereby the frame can be held between the slides with the horizontal box dimension of the lens opening 52 parallel to the reference line 20 as will be understood. In this arrangement, the vertical box dimension of the lens opening can extend directly between the clamp edges 14.1 and 16.1. Although it has been said that the lens opening can be centered on the post 48 before the slides 14 and 16 are adjusted, it will be understood that the slides can be adjusted individually and can be used for facilitating centering of the lens opening on the post 48.

Preferably a lens pattern mounting means can be located within the lens opening 52 of the ophthalmic frame. For example, it will be understood that a lens cutting or edging machine such as that described in U.S. Pat. No. 3,063,340 noted above can have an arbor which can fit through a central bore in a lens pattern for mounting the pattern in a machine during cutting or edging of a lens. In such a case according to this invention, a pattern mounting means located within the lens opening 52 can comprise a preformed bushing 56 having central bore 56.1 which is of a suitable diameter to be received upon the arbor of said lens cutting or edging machine. This bushing can be fitted over the post 48 to rest upon the post flange portion 48.2, the post portion 48.3 being of a suitable diameter corresponding to that of the arbor of said cutting or edging machine for snugly receiving the bushing and for centering the bushing within the lens opening 52. The bushing can be provided with holes 56.2 for cooperation with driving pins or the like on the lens cutting or edging machine if desired (see FIG. 4) and preferably one such hole is adapted to fit over the upwardly extending part of the post locating pin 50 for holding the bushing in a selected position of rotation around the post 48 (see FIGS. 1 and 2). In an advantageous construction, the bushing can be serrated or otherwise provided with reentrant surfaces as at 56.3, whereby the bushing can be more readily adhered to material molded thereon. The preformed bushing can preferably be formed of hardened steel or the like but the bushing could be formed of plastic or other material within the scope of this invention. If desired, a washer 58, preferably of rubber or plastic, can be fitted over the post 48 on top of the bushing 56 as shown in FIG. 2 for purposes to be explained below.

In accordance with this invention, a lining strip 60 can be arranged within the lens opening 52 to conform to the periphery of the lens opening, this lining strip being adapted to engage the base plate surface 12.2 beneath the lens opening in edgewise abutting and upstanding relation to said base surface. This lining strip can be formed of any paper, plastic or metal material or the like which can be readily conformed to the periphery of the lens opening but is preferably formed of a relatively long, thin and narrow strip of spring steel or other somewhat resilient material. This lining strip can be normally flat but can be inserted within the lens opening 52 in a loosely coiled disposition and can be permitted to uncoil within the lens opening in response to its material resilience to be closely conformed to the peripheral configuration of the lens opening. The lining strip can be permitted to overlap within the lens opening as indicated at 60.1, particularly where the strip material is of a thickness of about 0.002 inch or the like. In such a case, a clip 60.2 of any conventional type (shown only in FIG. 2) can be employed for holding overlapping portions of the lining strip together. Alternatively, the lining strip can be trimmed within the lens opening to prevent overlapping of the strip.

It can be seen that the lining strip 60 and the upper surface 12.2 of the apparatus base plate serve to form the side wall and bottom respectively of a mold cavity 62 having a configuration which hereby corresponds to that of the lens opening 52. It can also be seen that the lens pattern mounting bushing 56 can be located at the center of the mold cavity 62. In accordance with this invention, a moldable material 64 can be cast within the mold cavity 62 around the bushing 56 to form a lens pattern 66 having the configuration of the lens opening 52 and to attach the lens pattern to the pattern mounting bushing 56. The moldable material can comprise any suitable material adapted to assume the shape of the mold cavity and to be hardened or cured within the cavity for retaining the configuration of the cavity. Preferably, however, the moldable material 64 can comprise a plastic or metallic material of relatively low melting temperature which can be melted by any conventional means (not shown) and which can be conveniently introduced into the mold cavity 62 by means of a dropper 68 or the like as shown in FIG. 2. For example, the material 64 can comprise a low melting solder lead or other metallic alloy having a melting temperature of approximately 200° F. or less which can be cast within the mold cavity 62 without injuring the materials of the opthalmic frame 18. Where the base plate 12 is formed of a material of relatively high heat conductivity, the material 62 can be rapidly cooled within the mold cavity 62 as will be understood. The washer 58 can form a dam around the post 48 for preventing flow of the material 64 between the post 48 and for the bushing 56.

When the lens pattern 66 has been formed in the manner above-described, the pattern can be removed from within the lens opening 52 of the frame 18. As can be seen by reference to FIG. 4, the lens pattern can have an outer configuration closely corresponding to that of the lens opening 52 and can have a mounting bushing 56 molded therein for use in mounting the pattern in a lens cutting or edging machine. The lens pattern can have a substantial thickness to provide a suitable cam surface 66.1 thereon and can be very rigid and strong. The serrated edges 56.3 of the bushing 56 can be firmly embedded in the body of the lens pattern for assuring that the body of the pattern can be rotated or driven by means of the bushing holes 56.2.

In accordance with this invention, the lens pattern 66 can be again fitted over the centering post 48 mounted in the base plate aperture 38 as shown in FIG. 5 for boxing or determining the box dimensions of the lens pattern. The locating pin 50 on the centering post can be disposed within the locating hole 42 in the base plate counterbore 40 and the hole 56.2 of the bushing 56 can be fitted over the locating pin 50. In this way, the lens pattern can be relocated in the base plate 12 in exactly the same disposition as it previously occupied within the lens opening 52 of the ophthalmic frame. Accordingly, the horizontal box dimension of the lens pattern 66 can be parallel to the base plate reference line 20 and the vertical box dimension of the pattern can be perpendicular to the reference line 20. In accordance with this invention, the slides 14 and 16 can be adjusted until the slide edges 14.1 and 16.1 engage or grip opposite sides of the lens pattern 66. The pointer 36 on the slide 16 can thereby be aligned with the appropriate indicia 32 on the slide 14 for indicating the total spacing between the slide edges 14.1 and 16.1, thereby to indicate the vertical box dimension of lens pattern.

The centering post 48 can then be grasped at its upper end 48.4 and can be lifted from within the base plate aperture 38 for lifting the lens pattern 66. The bushing locating hole 56.2 can remain fitted around the locating pin 50 so that the lens pattern 66 and the post 48 can remain in the same positions relative to each other. The post 48 and the pattern 66 can then be rotated 90° in the plane of the lens opening 52 until the locating pin 50 is aligned with the base plate locating hole 44 and the post 48 can be lowered into the base aperture 38 as shown in FIG. 6, the pin 50 fitting into the locating hole 44. In this way, the horizontal box dimension of the lens pattern can be disposed exactly perpendicular to the base plate reference line 20. The slides 14 and 16 can then be adjusted so that the slide edges 14.1 and 16.1 again engage opposite sides of the lens pattern 66. The pointer 36 can thereby be aligned with the appropriate indicia 32 on the slide 14 for indicating the total spacing between the slide edges, thereby to indicate the horizontal box dimension of the lens pattern. Of course, the alignment of the reference mark 30 with the indicia 32 and 34 can also be checked to assure that the slide edges 14.1 and 16.1 are each spaced the same distance away from the reference line 20, thereby to assure that the bushing 56 is centered within the lens pattern as will be understood.

It can be seen that the apparatus of this invention is of simple, rugged and inexpensive construction and can be conveniently, accurately and economically employed for making lens patterns to be used in preparing lenses to fit ophthalmic frames and for determining the box dimensions of lenses necessary to fit said frames. It should be understood that although particular embodiments of the apparatus of this invention have been described for the purpose of illustration, this invention includes all modifications and equivalents of the described apparatus which fall within the scope of the appended claims.

I claim:

1. Apparatus for making and boxing a lens pattern comprising
    a base,
    a pair of clamp means mounted in spaced relation to each other, said clamp means being adjustable to hold an ophthalmic frame therebetween with a lens opening of the frame extending over said base,
    a lining to be arranged around the periphery of said lens opening in abutting relation to said base for defining an open-ended mold cavity corresponding in configuration to said lens opening, means for introducing moldable material into said mold cavity to form a lens pattern therein, and means indicating the spacing between said clamp means, whereby a lens pattern can be formed in said mold cavity and can thereafter be held between said clamp means for determining the box dimensions of the pattern by reference to the spacing between said clamp means.

2. Apparatus for making and boxing a lens pattern comprising a base, a pair of clamps mounted in spaced relation and movable relative to each other to hold an ophthalmic frame between the clamps with a lens opening of the frame extending over the base and with a box dimension of said lens opening extending directly between said clamps, means supporting lens pattern mounting means within said lens opening in two alternate positions which are oriented at an angle of 90° relative to each other in the plane of said lens opening, a lining to be arranged around the periphery of said lens opening in abutting relation to said base for defining an open-ended mold cavity corresponding in configuration to said opening, means for introducing moldable material into said cavity around a pattern mounting means supported in one of said alternate positions to mold a lens pattern in the configuration of said cavity and to attach said pattern to said pattern mounting means, and means indicating the spacing between said clamps, whereby a lens pattern can be made in the configuration of said lens opening and can thereafter be held between said clamps with said pattern mounting means alternately supported in each of said alternate positions for determining the box dimensions of the pattern by reference to the spacing between said clamps.

3. Apparatus for making and boxing a lens pattern comprising a base, a pair of clamps mounted in spaced relation to each other, said clamps being movable relative to each other to hold an ophthalmic frame between the clamps so that a lens opening of the frame extends over the base and so that a box dimension of said opening extends directly between said clamps, a post mounted in said base between said clamps for receiving a lens pattern mounting bushing thereon and for supporting said bushing in the center of said lens opening, said post being movable in said base for supporting said bushing in two alternate positions which are oriented at an angle of 90° relative to each other in the plane of said lens opening, a lining strip to be arranged around the periphery of said lens opening in abutting relation to said base for defining an open-ended mold cavity of a configuration corresponding to the configuration of said opening, means for introducing moldable material into said mold cavity around a pattern mounting bushing supported in one of said alternate positions to mold a lens pattern lining the configuration of said opening and to attach said pattern to said bushing, and means indicating the spacing between said clamps, whereby a lens pattern can be formed in the configuration of said lens opening and can thereafter be held between said clamps with said bushing alternately supported in each of said alternate positions for determining the box dimensions of the pattern by reference to the spacing between said clamps.

4. Apparatus as set forth in claim 3 having indicia on said base indicating distances along said base radially outward from said post so that said lens opening of said frame can be centered around said post by reference to said indicia.

5. Apparatus for making and boxing a lens pattern comprising a base, a pair of slides having respective first edges disposed in parallel facing relation to each other, said slides each having another edge disposed in obliquely extending relation to said first slide edge, shoulder means extending above said base to be slidably engaged with said other slide edges so that said slides can be moved along said shoulder means for moving said parallel slide edges toward each other to clamp an ophthalmic frame therebetween with a lens opening of the frame extending over said base and with a box dimension of said lens opening extending directly between said parallel slide edges, means releasably securing said slides in clamping relation to said frame, means supporting lens pattern mounting means within said lens opening in two alternate positions which are oriented at an angle of 90° relative to each other in the plane of said lens opening, a lining strip to be arranged around the periphery of said lens opening in abutting relation to said base for defining an open-ended mold cavity corresponding in configuration to said lens opening, means introducing moldable material into said cavity around a pattern mounting means supported in one of said alternate positions for molding a lens pattern and for attaching said pattern to said mounting means, and means indicating the spacing between said parallel slide edges, whereby a lens pattern can be molded in the configuration of said lens opening and can thereafter be clamped between said parallel slide edges with said pattern mounting means alternately supported in said alternate positions for determining the box dimensions of said pattern by reference to the spacing between said slide edges.

6. Apparatus as set forth in claim 5 wherein said shoulder means comprise a pair of bumper pins rotatably mounted on said base adjacent said other edge of each slide, each bumper pin having an eccentric portion to be rotated into engagement with the slide edge adjacent thereto and having locking means for securing said pin in said slide engagement, whereby said first slide edges can be disposed in parallel facing relation to each other and said bumper pins can be rotated into and locked in engagement with said other slide edges for defining said shoulder means.

7. Apparatus as set forth in claim 5 wherein said indicating means comprise indicia on said base and cooperable indicia on said slides adapted to be aligned with said base indicia during movement of said slides for indicating the spacing of said first slide edges from each other.

8. Apparatus for making and boxing a lens pattern comprising, a base, a pair of substantially identical slides having respective first edges disposed in facing parallel relation to each other, said slides each having another edge disposed in obliquely extending relation to said first slide edge, shoulder means extending above said base to be slidably engaged with said other slide edges so that said slides can be moved along said shoulder means for obliquely moving said parallel slide edges toward each other to clamp an ophthalmic frame therebetween with a lens opening of the frame extending over said base and with a box dimension of said lens opening extending directly between said parallel slide edges, means releasably securing said slides in clamping relation to said frame, a post mounted in said base for receiving a lens pattern mounting bushing thereon and for supporting said bushing in the center of said lens opening, said post being movable in said base for supporting said bushing in two alternate positions which are oriented at an angle of 90° relative to each other in the plane of said lens opening, a lining strip to be arranged around the periphery of said lens opening in abutting relation to said base for defining an open-ended mold cavity in the configuration of said lens opening, means for introducing moldable material into said cavity around a pattern mounting bushing supported in one of said alternate positions to mold a lens pattern and to attach said pattern to said bushing, indicia on one slide extending along a first edge thereof, and corresponding indicia carried by said other slide adapted to be aligned with said indicia on said one slide during relative movement of said slides for indicating the spacing of said parallel slide edges from each other, whereby a lens pattern can be molded in the configuration of said lens opening and can thereafter be clamped between said parallel slide edges with said pattern mounting means alternately supported in said alternate positions for determining the box dimensions of said pattern by reference to the spacing between said slide edges.

References Cited in the file of this patent
UNITED STATES PATENTS

| | | |
|---|---|---|
| 2,146,599 | Smith | Feb. 7, 1939 |
| 2,452,426 | Blaske | Oct. 26, 1948 |
| 3,108,853 | Short et al. | Oct. 29, 1963 |
| 3,113,347 | Kufrovich | Dec. 10, 1963 |